(12) United States Patent
Mayblum et al.

(10) Patent No.: US 8,935,617 B2
(45) Date of Patent: Jan. 13, 2015

(54) CENTRALIZED MEDIA HANDLING

(71) Applicant: Cellco Partnership, Arlington, VA (US)

(72) Inventors: Amir Mayblum, Walnut Creek, CA (US); Kim M. Gutierrez, Alameda, CA (US); Chunkwok Lee, Santa Clara, CA (US)

(73) Assignee: Cellco Partnership, Basking Ridge, NJ (US)

( * ) Notice: Subject to any disclaimer, the term of this patent is extended or adjusted under 35 U.S.C. 154(b) by 152 days.

(21) Appl. No.: 13/632,860

(22) Filed: Oct. 1, 2012

(65) Prior Publication Data
US 2014/0096032 A1 Apr. 3, 2014

(51) Int. Cl.
*G06F 3/14* (2006.01)

(52) U.S. Cl.
USPC ........ 715/752; 715/783; 707/104.1; 709/206; 345/111

(58) Field of Classification Search
CPC .................................. G06F 3/14; G06F 3/17
USPC .......... 715/200–277, 700–867; 700/701–866; 709/201–229; 705/50–79; 345/30–111; 707/104.1
See application file for complete search history.

(56) References Cited

U.S. PATENT DOCUMENTS

2005/0235034 A1* 10/2005 Chen et al. ............... 709/206
2007/0088747 A1* 4/2007 Cheng et al. ............ 707/104.1
2012/0174025 A1* 7/2012 SanGiovanni et al. ...... 715/783

* cited by examiner

*Primary Examiner* — Ruay Ho

(57) ABSTRACT

A system is described that includes a media management application for automatically scanning messages in a message inbox and new messages that are sent from or received by the message inbox to identify content, such as pictures, songs, etc., for tagging each message based on content attributes, and for storing the messages and content in a "shoebox" relative to the content attributes.

21 Claims, 6 Drawing Sheets

CENTRALIZED MEDIA HANDLING

BACKGROUND

Telecommunications service providers often provide customers with various resources for managing content. Often, content is communicated using electronic mechanisms such as short messaging service (SMS), multimedia messaging service (MMS), text messaging service, e-mail messages, and the like. However, users may not have efficient mechanisms for keeping track of various media, or for accessing content. For example, users may not have efficient mechanisms for evaluating a hyperlink communicated through the electronic mechanisms prior to visiting a website that includes a web page or other content pointed to by the hyperlink to assist in determining whether a hyperlink may be considered to be a trusted link.

DETAILED DESCRIPTION

A system that includes a media management application automatically scans messages in a message inbox to identify content (e.g. pictures, songs, etc.), tags each message based on content attributes, and stores the messages and content in a "shoebox" relative to the content attributes.

Figure 1:
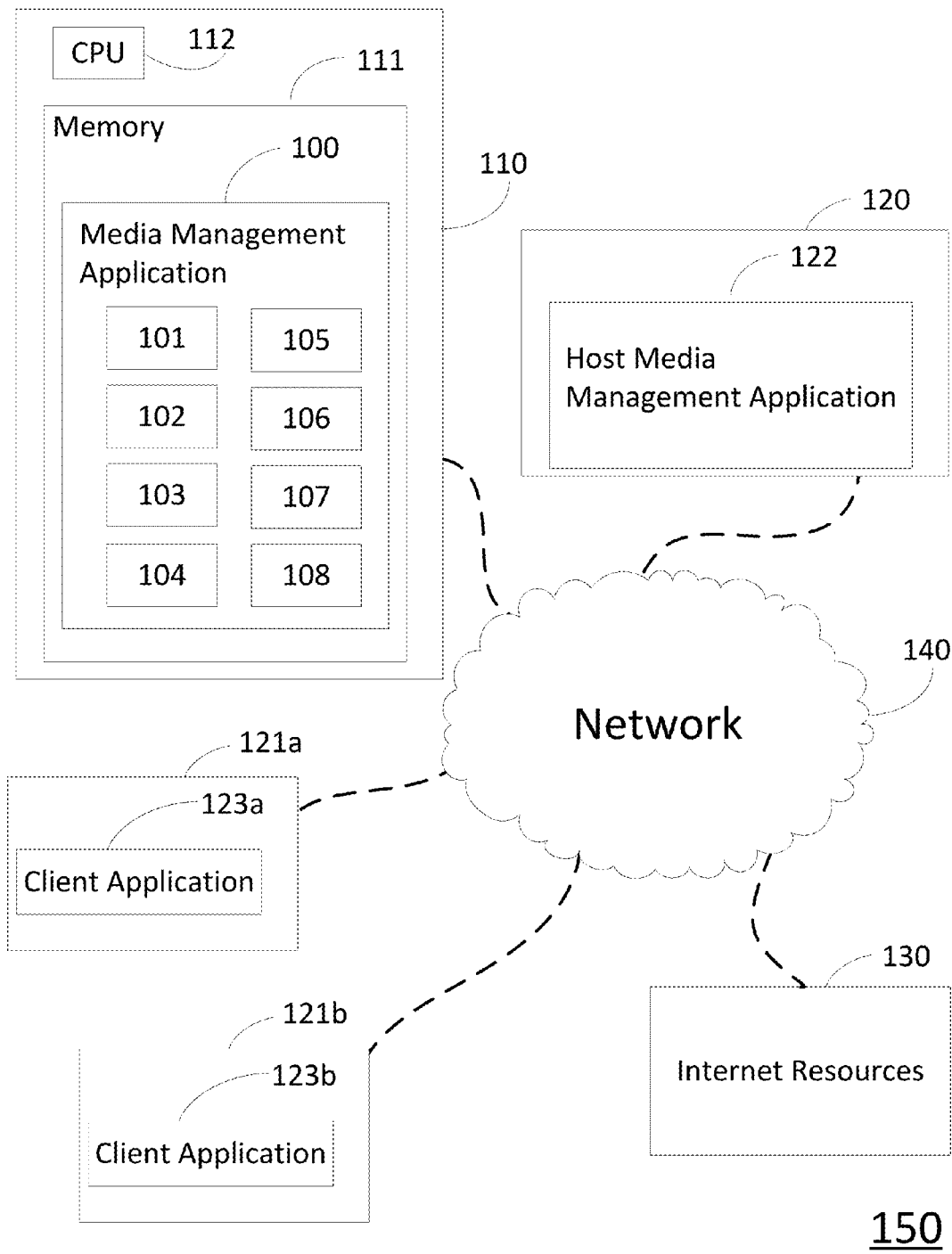
FIG. 1 illustrates an exemplary system for media management within an inbox of a messaging services.

FIG. 1 illustrates an exemplary system 150 for media and/or message management. The system 150 includes a device 110; the device 110 in turn includes a media management application 100 constructed from program code that is stored on a memory 111 and executable by a central processing unit (CPU) 112. The application 100 is generally configured to store and manage media and content using a tagging module 101, a storing module 102, an interface module 103, an imaging module 104, a media data access module 105, a location control module 106, an application module 107, and/or a scraper module 108.

The system 150 further includes a host management device 120. The device 120 in turn includes a host media management application 122 that, e.g., via a network 140, stores and manages messages for use by client devices 121, which include client media management applications 123. In general, electronic devices 110, 120, and 121 each include applications 122, 123, etc., e.g., as a set of instructions stored in a memory of a device 110, 120, 121 and executable by a processor of a device 110, 120, 121. A client device 121, such as a mobile phone, may utilize conventional web browsing or mobile application technology, and may not utilize all of the foregoing modules 101-108. The client application 123 is thus sometimes referred to as a "light" version of the media management application 100. The host media management application 122 generally may include any combination of the above modules.

Computing devices, including devices 110, 120, 121, etc. may be any computing device, that may communicate, e.g., via the network 140, with internet resources 130, which may include one or more of a variety of resources, including website databases, file storage databases, media databases, data repositories, and the like that are implemented through hardware, software, or both.

The media management application 100 generally executes an automatic background process of scanning messages for content, applying tags, and creating or adding messages and content to a file or set of files referred to as a "shoebox." Content (i.e., content within messages, content associated with messages within the messaging inbox, or content contained in an inbox of a messaging service) includes any media, multimedia, link, contact, location information, or the like that is either sent or received to or from a device 110, 120, 121. Messages that have content identified during the scanning process may be referred to as "priority" messages.

A shoebox is a file or set of files that includes logs and stored content, related to messages, to facilitate a multi-modal conversation. A multi-modal conversation is a conversation that involves more than one method of communication (e.g. voice communications, sending text messages, sending messages that include images, etc., using devices 110, 120, and 121). More generally, "shoebox" is a unit of storage, e.g., a folder providing storage in device 110, 120, 121, for organizing priority messages for user access and interaction. Further, shoeboxes usually store similar messages and content. For instance, one shoebox may be used for storing priority messages according to one tag, such as photographs, while another shoebox may store priority messages according to another tag, such as locations. For example, the Location shoebox may store postal address information and/or geographical identification metadata. An example of postal address information may be a postal address of a doctor's office that a user has manually entered in textual form. An example of geographical identification metadata may be geographical location metadata that is automatically associated with a video file while the video file is recorded. Shoeboxes may also be part of a media or contact information repository (e.g., a database that is an internet resource 130) where priority messages extracted from a messaging inbox are deposited and organized. Further, each shoebox may be represented by a specific user display. That is, a user interface of the media management application 100, 122, 123 may include a set of specific user displays that represents each shoebox. For instance, each specific user display may be a tile (e.g. the tile menu 203 of FIG. 2 or the shoebox list view 300 of FIG. 3); each tile may present information that represents the type of shoebox and/or information stored in a shoebox. For instance, each tile may include an icon. An icon may be a pictogram, small picture, symbol, or the like serving as a quick and intuitive representation of a software tool (e.g. representing the data in a shoebox) displayed on a display screen. Further, each tile may include a title. A title may be identical to the tag used to create a shoebox. Thus, a tile that is associated with a "multimedia" shoebox may present a "camera" icon, which a user will intuitively recognize as serving as a symbol for pictures and videos, and the title "multimedia," which is identical to the tag used to create the "multimedia" shoebox.

Furthermore, the size and shape of each specific user display may vary based on the shoebox and on a type of device 110, 120, 121 (e.g. as bigger screen sizes permit larger shoebox formats that allow more content to be displayed). That is, on a mobile device, each tile may be a uniform size while displaying different but similarly sized icons. On a tablet device, each tile may be altered to clearly display the messages or content within a shoebox. For example, a tile associated with a "multimedia" shoebox may have an aspect ratio of 4:3 such that videos being displayed within the shoebox are not distorted. (The aspect ratio of a tile describes the proportional relationship between the tile's width and its height.) Further, a tile associated with a "contact" shoebox may have an aspect ratio of 2:6 such that contact names may be listed vertically within the tile. In addition, the media management application 100 may present a user interface to permit user operations and manipulation of priority messages from a messaging inbox within the specific user display and of the aspect ratios and orientations of the specific user displays, as further described below.

Messages may be assigned tags when scanned for content. For example, a scalable tag list is a list of tags, organized, e.g., by title or category, that are used to tag priority messages according to the content included in the message. Tags may include, but are not limited to, web links, contact information, postal addresses, email addresses, phone numbers, location information, photographs, audio files, video files, etc. The tag list is referred to as scalable because the list may add or subtract tags as needed by the media management application 100. That is, to take just one example, given the following tag list: {photographs, audio files, locations, contacts, links}, a media management application 100 may add "video files" to the list while subtracting "photographs." The media management application 100 determines particular tags that are appropriate for describing content found in priority messages.

The message scanning process may utilize content attributes such as message metadata attributes or parameters that the media management application 100 may use to identify priority messages (i.e., content and messages associated with content) in the messaging inbox. For example, content attributes may include, but are not limited to, top level domain designations, file extensions, data or file size limits, key words, metadata, location signatures, country or zip codes, etc. Therefore, when a content attribute, e.g., a parameter such as a data limit, is matched (or exceeded) by a data size of a message in the messaging inbox (i.e., the file size attribute of a message exceeds a predefined file size), the message is identified as being associated with content and thus a priority message. Another example of the media management application 100 using a content attribute to identify priority messages is when a picture message, such as a picture of a cake with candles, is sent between devices 110. Regardless of whether the picture message is accompanied by a textual message (e.g. "happy birthday") or sent with no accompanying textual message, the picture message (and thus the picture) is compared to a set of attributes. For example, the media management application checks whether a file extension attribute, such as ".gif" or ".jpeg," is associated with the picture message. When the file extension attribute is associated with the picture message, the picture messages is identified as a priority message, the priority message is assigned a photographs tag, and the priority message is placed in the "photographs" shoebox for media management, while the message "happy birthday" may or may not be carried into the shoebox.

As mentioned above, upon receipt of a message, the media management application 100 triggers a background scanning and tagging process that compares content attributes to message attributes to tag messages in a messaging inbox, e.g., on a device 110, 121, etc., with tags from a scalable tag list when those messages contain content (messages that contain content may be referenced to as priority messages herein). Once tags are applied, message shoeboxes are created based on the tags used from the scalable tag list to hold and present the priority messages.

Figure 2:
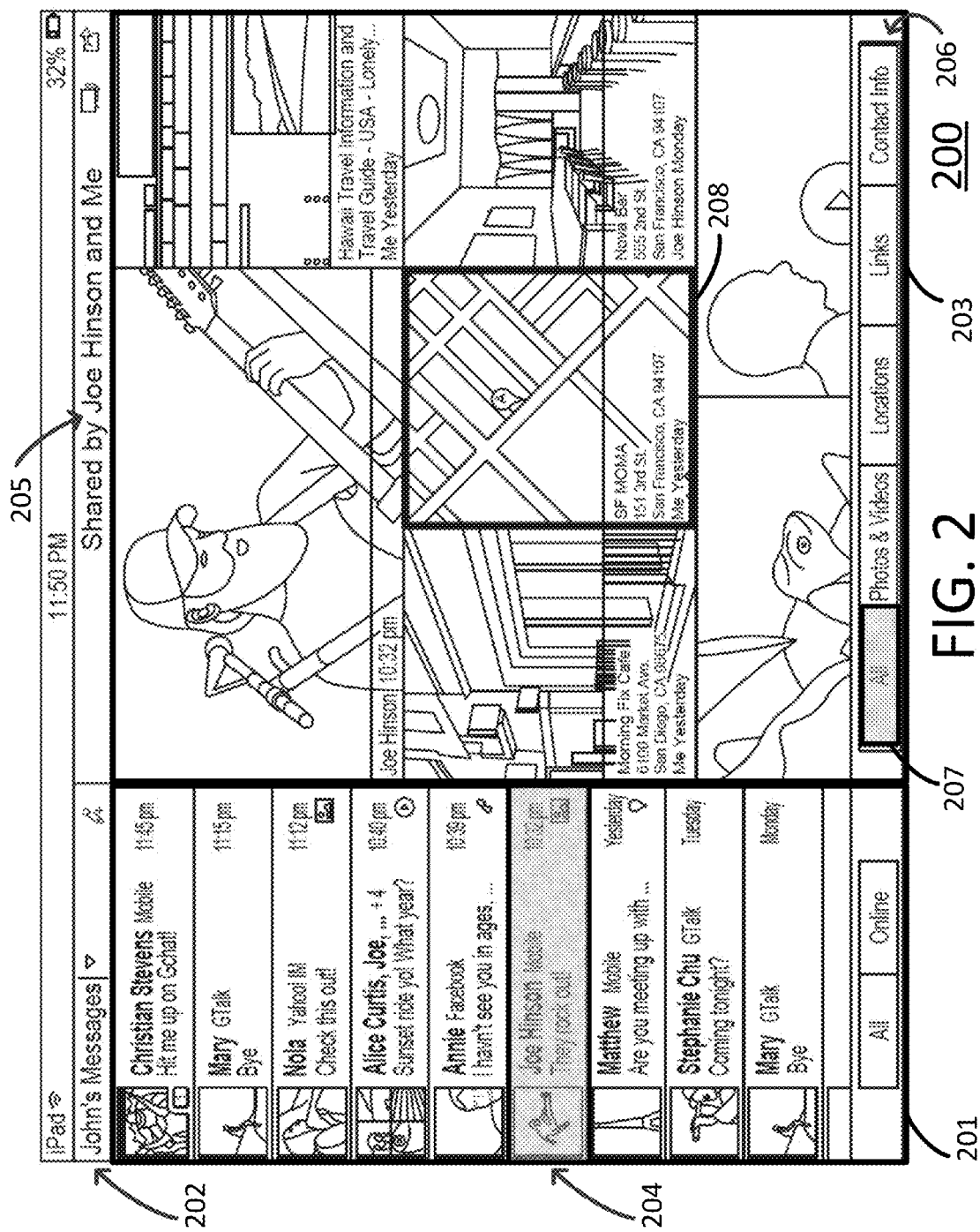
FIG. 2 illustrates an exemplary user interface as generated by a media management application.

For example, FIG. 2 illustrates an exemplary user interface 200 that presents specific user displays associated with shoeboxes as generated by a media management application 100, 122, 123 stored in the memory of a device 110, 120, 121 for the facilitation of a multi-modal conversation (a conversation being a set of messages between users of respective devices). The interface 200 includes a sub-menu 201, which lists conversations (i.e. conversation-level) between a currently loaded user messaging account (e.g. the account labeled "John" 202) on the device 110, 120, 121 and remote user accounts loaded on respective remote devices 110, 120, 121. The interface 200 further includes a tile menu 203 that includes specific user displays (or tiles) based on the tags used from the scalable tag list. Each tile is customizable, as described above. Particularly, each customizable tile may represent information that has been stored in a shoebox; the size and shape of each customizable tile may vary based on the associated shoebox, and each customizable tile may be manipulated automatically or by user interaction.

In this particular example, sub-menu 201 lists conversations between John 202 and nine remote users (e.g., starting with Christian Stevens at the top and concluding with Mary at the bottom). Further, because the Joe Hinson conversation 204 (the sixth conversation from the top) is selected from the sub-menu 201, the customizable tiles in the tile menu 203 are generated in accordance with tags used from the scalable tag list for the messages and content transferred between the account 202 for "John" and Joe Hinson (i.e. "Shared by Joe Hinson and Me" 205).

Filter menu 206 lists the tag filters that automatically change the customizable tiles within the tile menu 203 based on the selected filter. In this example, the "All" filter 207 is selected, which enables the display of specific user displays associated with shoeboxes relative to the conversation between John and Joe Hinson (i.e. "Shared by Joe Hinson and Me" 205).

Among the specific user displays within the tile menu 203 in the exemplary interface 200 is the "Locations" tile 208. In this example, the "Locations" tile 208 displays a pin-point on a map for a most recently transferred address between John and Joe Hinson along with a label (SF MOMA), address (151 $3^{rd}$ St. San Francisco, Calif. 93107), sender (Me—i.e. John), and time stamp (Yesterday). That is, the "Locations" tile 208 is a specific user display associated with a "Locations" shoebox, and where present the most recently transferred address between John and Joe Hinson is provided in a map including a pin-point and accompanied by a label. Further, the size and shape of the "Locations" tile 208 may vary in accordance with a set of formatting rules. That is, the set of formatting rules may automatically define the aspect ratios and placement of the customizable tiles.

One example of a set of formatting rules that define the aspect ratios of customizable tiles may include: (1) tile menu 203 is arranged in a set of rows, (2) a uniform row height, which is a height of each row in the tile menu 203, is "1", (3) the height of each customizable tile is consistent with the height of each row, (4) a uniform row width, which is a width of each row in the tile menu 203, is "3", (5) the number of tiles in a row may be either "2" or "3", (6) the width of each tile must add together to equal the uniform for width, and (7) acceptable aspect ratios for each tile is limited to "1:1", "1.5:1", and "2:1".

One example of a set of formatting rules that defines the placement of the customizable tiles may include displaying the customizable tile in succession (from left to right and up to down) based on the times stamps of the content presented by the customizable tile.

Under these formatting rules, the tile menu 203 presents three rows. The upper-most row of the tile menu 203 (first row) contains two customizable tiles, with the leftmost customizable tile having an aspect ratio of 2:1 and the rightmost customizable tile having an aspect ratio of 1:1. The row below the first row of the tile menu 203 (second row) contains three customizable tiles including the "Locations" tile 208. Each customizable tile in the second row has an aspect ratio of 1:1. The third row (row below the second row), which is partially out-of-view in FIG. 2, contains two customizable tiles having aspect ratios of 1.5:1. The leftmost customizable tile receives its placement because its timestamp (i.e. 11:32 PM) is more recent then the customizable tiles that follow it (e.g. the "Locations" tile 208 has a time stamp of "Yesterday" and thus succeeds the leftmost customizable tile). The described aspect ratios and placement of the customizable tiles of the tile menu 203 and the set of formatting rules are examples, and it is understood that adjustments to the set of formatting rules may render new and different aspect ratios (and thus new and different sizes) and placements for the customizable tiles.

The customizable tiles within the tile menu 203 may be manipulated. That is, the customizable tiles may be re-ordered, re-sized, re-tagged, deleted, and the like. Re-ordering is a manipulation of placement of the customizable tiles within the tile menu 203. Re-ordering may be executed automatically by a sorting credential (e.g. the time and date when the tag was applied, the time and date message was received, and alphabetically) or manually by a user. Re-sizing may include a manipulation of the aspect ratio of a particular tile, the uniform row height, or uniform row width. Re-sizing may be executed automatically by an implementation of a set of formatting rules or manually by a user through the user interface 200. Re-tagging may be performed when a tag on a particular priority message is changed, added, or removed, by a user or automatically by the application. A deleting function may include the removal of a priority message from a shoebox, removal of a customizable tile from the tile menu 203, or the deletion of a shoebox and all its relative contents.

The customizable tiles within the tile menu 203 are selectable. That is, any one of the displayed shoeboxes may be selected such that a sub-interface may be displayed showing the content within that shoebox. For example, if the "Locations" tile 208 is selected, the sub-interface may be altered such that the sub-menu 201 may change from the conversation-level listing to a list of the locations stored within the "Locations" tile 208 and the tile menu 203 may change from the conversation-level listing to a singular map with pin-points according to the list of the locations. Similarly, if a "Links" shoebox is selected from the tile menu 203, the sub-interface may change the sub-menu 201 from the conversation-level listing to a list of links stored within the "Links" shoebox, and the tile menu 203 may change from the conversation-level listing to a singular link display that provides elements from a webpage associated with the link (i.e. a header element, a descriptor element, and a picture element according to a link resolution process described below).

Thus, FIG. 2 illustrates an exemplary user interface 200 according to a hierarchy of conversations (i.e. a conversation-level interface); that is, the selection of a conversation from the sub-menu 201 will govern the display of customizable tiles (representing shoeboxes) displayed in tile menu 203. Alternatively, the exemplary interface may be according to other hierarchies, such as a hierarchy of content (i.e. content-level). In this case, sub-menu 201 may display a list of content tags where the selection of a content tag from the list of content tags would alter the customizable tiles displayed by tile menu 203 to display conversations according to the selection. For example, when sub-menu 201 displays the list of content tags and when a user selects the "Links" tag from sub-menu 201, the customizable tiles to the right of sub-menu 201 would display a customizable tile for each conversation that has a link.

The interface module 103, which is also further described below, generates and displays the user interfaces described above, and these user interfaces permit user operation of the media management application features to manipulate the content. Further, each shoebox has a specific display generated by the interface module 103 that presents the content of the shoebox. For instance, the "Links" shoebox displays resolved uniform resource locator (URL) information, such that a header, photo, and description are displayed (i.e. the header element, the descriptor element, and the picture element according to the link resolution process described below). Similarly, the "Locations" tile 208 displays a cartographical view of an address (e.g. pin-points on a map). Thus, using the interfaces as displayed by the interface module 103, a user may browse priority messages based on the tag type using the relative shoebox.

Figure 3:
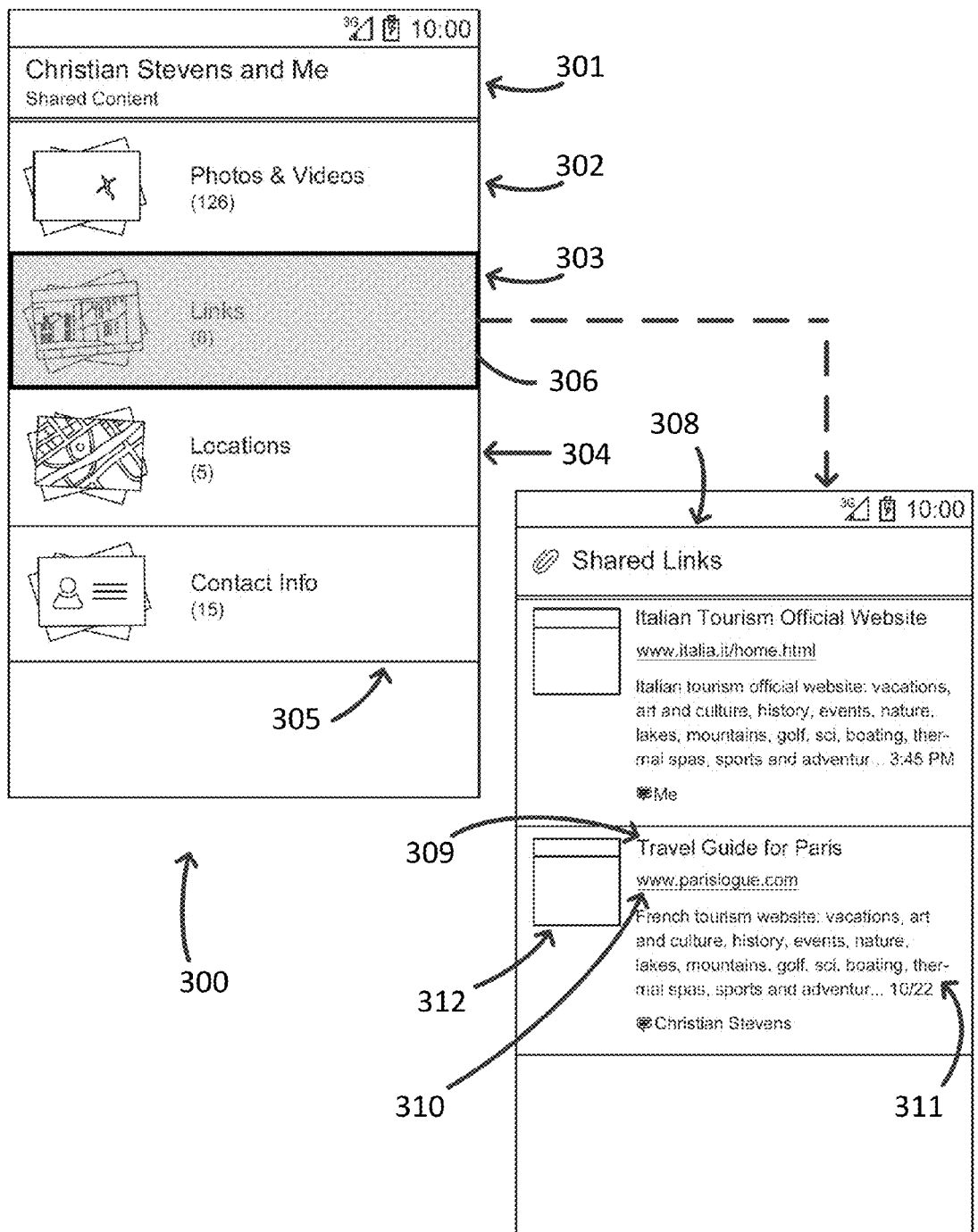
FIG. 3 illustrates an exemplary user interface as generated by a media management application.

Note that the interface 200 of FIG. 2 is based a tablet screen, yet the media shoeboxes may take different formats based on the target device (See FIG. 3). In general, the interface module 103 automatically customizes the interface 200 to fit different screen sizes based on landscape vs. portrait display modes and based on device type (as bigger screen sizes permit larger shoebox formats that allow more content to be displayed). For instance, a tablet screen size may permit a higher level of manipulation and "shoeboxing" compared to mobile phone screen size. Thus, the "Locations" tile 208 of the interface 200 (e.g. a tablet interface) may be displayed as a rectangular tile. The rectangular tile may further depict an address in text form on top of a map of the streets related to the address that includes a pinpoint of the address. In contrast, the "Locations" shoebox 304 of the interface 300 (e.g. a mobile phone interface) may be displayed as a rectangular tile for including an icon, a title (i.e. locations), and a number indicating the number of locations currently in the "Locations" shoebox 304.

Other operations of the interfaces generated by the interface module 103 include re-ordering, re-tagging, deleting, adding, and the like, as described above. For example, in the case of re-tagging, a user may edit the tags through the interface 200 on a per message basis within a conversation to correct the automatically assigned tags by selecting a conversation from the sub-menu 201, selecting a customizable tile from tile menu 203 to generate a sub-interface that shows the content within that shoebox, and selecting the content to edit that content's tag. Another example is manual intervention bookmarking, where users are permitted to use specific prompts and tags while messaging, so that a user may tag a message before it is sent.

In addition, the user interfaces of the media management application may be connected via the application module 107 to the user interface of the messaging service, such that when changes are made within one displayed interface they are reflected in the other (e.g. when a message is deleted within the inbox of a messaging service then the tags and the like are also deleted in the application user interface). Further, when tags are defined in the background by the media management application 100, those tags may be displayed and alterable through the messaging service interface. Similarly, when messages are viewed through the messaging service interface and after the tags are automatically assigned by the media management application, the re-tagging feature of the media management application may be used to correct any desired tags.

Returning to FIG. 1, the tagging module 101 included in the application 100 includes program code for scanning and tagging priority messages. Generally, the tagging module 101 compares content attributes to message attributes in order to tag messages in a messaging inbox, e.g. messages being received or previously stored, with tags from the scalable tag list when those messages contain content that meet content criteria. Thus, the tagging module may identify messages as priority messages, and assign tags based on content attributes, message attributes, and a knowledge base (which is described further below). Further, the tagging module 101 generally determines which tag to assign to a priority message based on which content attribute is matched by the messages (e.g. when the priority message receives a photographs tag from the tagging module because the file extension attribute of ".gif" was found). In addition, the tagging module 101 generally determines whether a priority message should be assigned more than one tag based on the number and type of content attributes that are met or exceeded when a message is scanned. The tagging module 101 also creates, sends, and processes requests for scanning, tagging, and storing messages, such that a client device 121 may communicate the requests to the host management device 120 to utilize the resources of the host media management application 122.

The tagging module 101 also includes program code for assigning a "may be of an interest" tag, which is a temporary tag to messages that may include content partially matching a content attribute. For example, a textual message, which has not been identified as a priority message, may include a five-digit number, but fail to include additional postal address information that would meet an address content attribute (e.g. the address content attribute may also require "St." "Dr." or "Ave." be located within 30 characters of the five-digit number). The tagging module may subsequently assign this textual message with the "may be of an interest" tag rather than interpreting the five-digit number as a zip code and incorrectly tagging the textual message as a location. Next, a user may review the textual message that was tagged with a "may be of an interest" tag, and may indicate whether the five-digit is a zip code, for example, by indicating that the textual message should be re-tagged, or by indicating that the five-digit number is not a zip code, for example, by deleting the "may be of interest tag."

The tagging module 101 further creates or generates shoeboxes based on tag assignments. That is, the tagging module 101 creates shoeboxes based on the tags that were applied to the priority messages. For example, the tagging module 101 may generate the file structure that organizes priority messages for user access and interaction into storage units, e.g., folders in a file system of a device 110, 120, 121. These storage units are used by the interface module 103 to generate a user interface such as the interface 200 shown in FIG. 2 to present each shoebox in a tile, list, or grid format for user viewing and manipulation. Additionally, when a new tag is assigned to a newly identified priority message (i.e., a message that has been recently added to the messaging inbox, that was not previously scanned, and that contains content), the tagging module 101 will utilize that new tag to accordingly create a new shoebox.

In addition, the tagging module 101 generates tagging information from the scanning and tagging of priority messages to develop the knowledge base mentioned above. Tagging information may include information that indicates which content attributes where matched or exceeded for priority messages. Therefore, existing tagging information will be used as a knowledge base for future tagging. Further, building the knowledge base consists of a set of default rules (i.e. rules that map content to a specific tag) that is altered by a heuristic process. That is, the heuristic process both creates the knowledge base from a default set of tagging information and alters the tagging rules (based on scanning, identifying, tagging, and storing priority messages) at the same time as the tagging module 101 is using the altered tagging rules (to scan, identity, tag, and store messages in an inbox of a messaging service). For instance, a default knowledge base (i.e. a preset of rules for tagging priority messages) may be initially used to tag priority messages and content based on content type. For instance, picture format files are mapped by default to a "Pictures and Videos" tag. When a user changes the default "Pictures and Videos" tag of an existing priority message to a new "Pictures" tag, the tagging module may adjust the default rule accordingly. Thus, new priority messages that have similar characteristics (source/destination addresses, media type, etc.) to the existing priority message may be placed into "Pictures" category based on the rule based knowledge base. As another example, the default knowledge base may be used to direct the tagging of priority messages and content using "Pictures and Video", "Audio", "Location", etc. tags, as default tags. A user may change this default by assigning a dividing the "Pictures and Video" tags into two separate tags. Thus, a user may set a new tag (i.e. "Pictures") for a new priority message and create a new rule that assigns future messages similar to the new priority message containing pictures this new tag. A user may also set a new tag (i.e. "Video") for a new priority message containing videos and create a new rule that assigns future messages similar to the new priority message this new tag.

The storing module 102 includes program code for storing and accessing priority messages and the knowledge base (e.g., storing the priority messages according to the file structure generated by the tagging module 101). In addition, the storing module 102 may store additional information other than the tagging information to build the knowledge base. For instance, additional information may include information identifying messages that have been bookmarked by a user, tag alteration information identifying messages whose tags have been altered, and the like. Bookmarked message information is information regarding messages that a user has manually tagged with a custom tag, which may have been manually added by the user to the scalable tag list. Tag alteration information is information regarding messages that received a tag from the tagging module 101, and were later re-tagged or given a different tag by a user or the tagging module 101. Thus, if the amount of alteration information increases, the tagging module 101 may tag specific messages based on the tag alteration information stored by the storing module 102. In general, the storing module 102 will store tagging information once the tagging information is generated by the tagging module 101. Further, the storing module 102 may, in response to a storing request generated by the tagging module 101, generate address information when storing priority messages and tagging information to the memory 111 of the device 110 or to a remote device, such as internet resources 130.

The interface module 103 includes program code for generating, presenting, and providing one or more user interfaces in connection with other modules (101-102 and 104-108). For instance, interface module 103 displays user interfaces (i.e. interface 200) for user management of the shoeboxes and priority messages. The interface 103 also includes program code for generating tag suggestions for user verification or selection (e.g. when a "may be of interest tag" is assigned to a message and a user is viewing the message, the tagging module 101 may suggest tags that partially trigger content attributes).

While presenting a plurality of user interfaces, the interface module 103 also includes program code for prompting menus for submitting additional information along with the user interfaces. For example, the interface module 103 may generate a pop-up interface, which is an interface that overlays, e.g., the interface 200, to facilitate a user's interaction with the device 110. The pop-up interface further provides instructions to the user along with buttons that allow a user to respond to the provided instructions.

For example, a user (e.g. John) may want to send a picture message of a birthday cake that needs to be picked up for a birthday party while standing at a bakery. The user may type (i.e. generate) a textual message that says "Joe Hinson, please pick up this cake at 2:00 PM!" while standing at the bakery. The user may then capture an image of a cake (via an imaging module 104) for association with the textual message. While the device 110 is processing the recently captured image of the cake, the interface module 103 automatically generates a pop-up interface that asks a user whether the user wants to initiate a location detection (via the location module 107) of a physical location of the device 110. The user selects a "yes" button that indicates the user wants to initiate the location detection. The user then sends the picture message of the birthday cake. In the background, while the picture message of the cake was being sent, the tagging module 101 identifies the picture message as a priority message and tags the picture message with a photographs tag and a locations tag. Now, when Joe Hinson receives and reviews the picture message on his device 121a, the client application 123a may use that location tag associated with the image of the birthday cake to identify the location of the bakery.

The interface module 103 may also display user interfaces in a menu (e.g., the interfaces discussed below with respect to FIG. 3), icon, tabular, map, or grid format. The interface module 103 also displays mapping (e.g., the "Locations" tile 208 displays a pin-point on a map for the most recently transferred address or the tile menu 203 may display a singular map with pin-points according to the list of the locations) and analytical tools to the user. Examples of analytical tools include concurrently displaying a table or grid of media data within designated shoeboxes so that a user can readily obtain and manage shoeboxes and priority messages. In addition, interface module 103 may, e.g., through a grid or table, permit reordering of display items, e.g., the user interface may allow users to reorder tiles, tags and messages based on preferences, on attributes (e.g. the time and date when the tag was applied, the time and date message was received, and alphabetically), or on any other characteristics. Further, the interface module 103 may also automatically hide or exclude priority messages from being displayed. For instance, the tagging module 101 may designate priority messages as stale or current. A current designation is a designation for a message whose time stamp is within a time threshold, i.e., within a fixed period of time.

A stale designation is a designation for a message whose time stamp is outside of a threshold. Thus, when the time stamp of a priority message exceeds the time threshold, the user interface 103 may automatically hide or exclude the priority message from the user interface. For example, when a time threshold is 24 hours, a time stamp of a priority message is 6:00 AM EST Jan. 1, 2012, and a current time is 5:00 AM EST Jan. 2, 2012, the user interface module 103 may detect that the priority message received a current designation from the tagging module 101 and display the priority message. Further, when the current time naturally progresses beyond 6:00 AM EST Jan. 2, 2012, the user interface module 103 may detect that the priority message received a stale designation from the tagging module 101 and note display the priority message.

FIG. 3 illustrates an exemplary user interface as generated by a media management application (note that in this example the media management application 100 is operating on a mobile phone). In general, the interface module 103 may first generate a menu of conversations that may be used for initially navigating a mobile phone user interface. In the current example, a user has successfully navigated the menu of conversations by selecting a Christian Stevens conversation. Thus, the interface, here a shoebox list view 300, is displayed by the media management application's 100 interface module 103.

Like the tile menu 203 discussed above, the shoebox list view 300 depicts a collection of shoeboxes that relate to the content and media within the Christian Stevens conversation, such that a user may pick any of the shoeboxes to further drill down and view the priority message. For instance, shoebox list view 300 is a one-column table, with a column header of "Christian Stevens and Me" 301, and a set of rows where each row relates to a specific shoebox as generated by the tagging module 101 (i.e. the shoeboxes of "Photos & Videos" 302, "Links" 303, "Locations" 304, and "Contact Info" 305). The number of messages containing tagged information may additionally be displayed. Further, when the "Links" shoebox 303 is selected (as indicated by box 306), the shoebox list view 300 changes into a link interface 307, which is displayed by the media management application 100, e.g., according to instructions in interface module 103. Moreover, when the "Links" shoebox 303 is selected 306, the link interface 307 is populated with information concerning web links (i.e. presentation elements) stored in the "Links" shoebox 303 associated with the Christian Stevens conversation by the link resolution process, which is further described below. The link interface 307, in this example, is a one column table, with a column header of "Shared Links" 308, and a set of rows where each row relates to a priority message that contains a specific URL (and thus received a links tag by the tagging module 101) and may contain a set of presentation elements, e.g., a header 309, the specific URL 310, a descriptor 311, and a picture 312, presented in a display.

Figure 4:
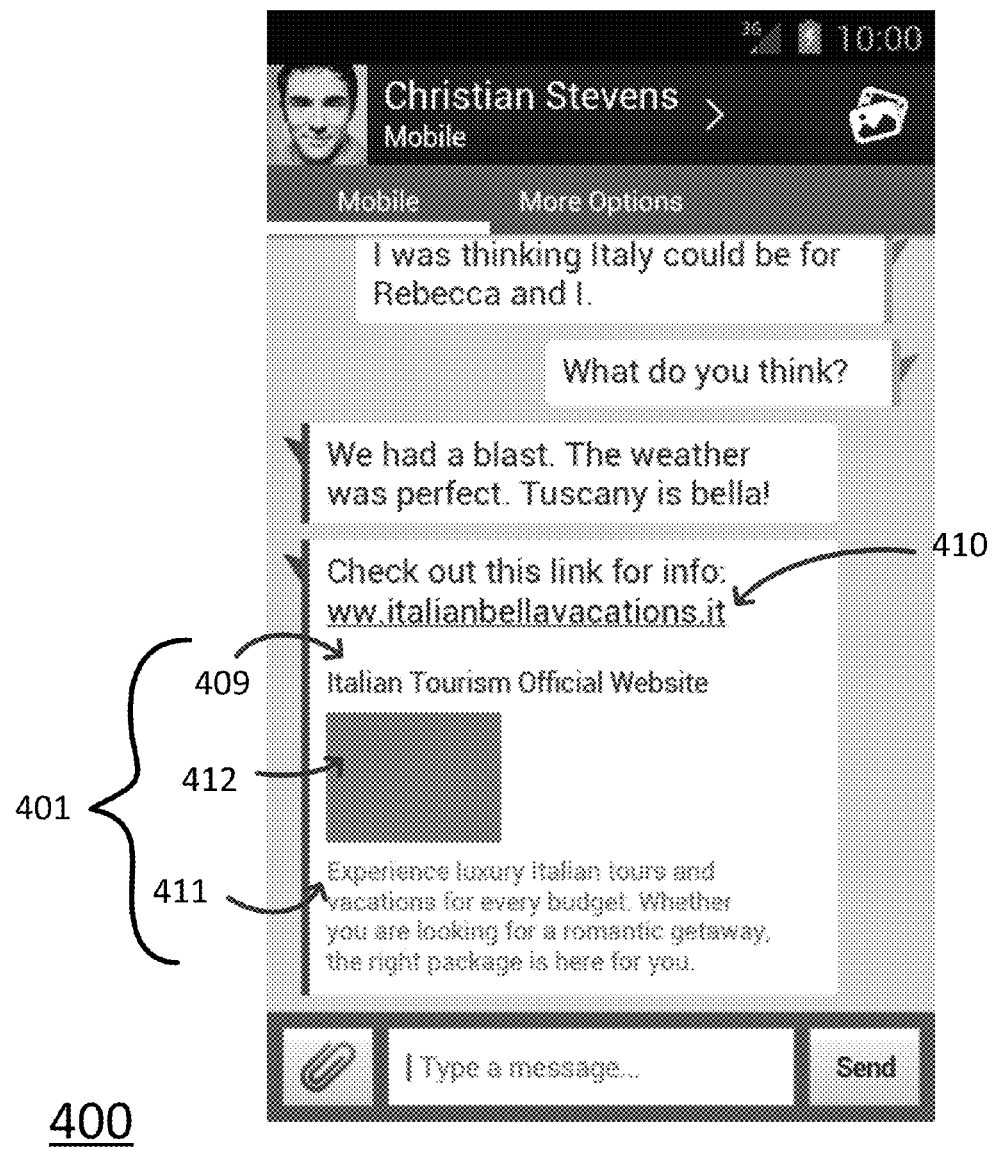
FIG. 4 illustrates an exemplary user interface as generated by a media management application.

Further, FIG. 4 illustrates an exemplary user interface 400 of a messaging service. In this example, the media management application 100 (note that in this example the media management application 100 is also operating on a mobile phone) via the interface module 103 generates the set of presentation elements, e.g., a header 409, a descriptor 411, and a picture 412, for presentation in a display 401 within a message of the messaging service. That is, when a message contains a web link or URL (i.e. "www.italianbellavacations.it"), and that message is viewed though the user interface 400 of a messaging service, the media management application 100, e.g., according to instructions in interface module 103 will insert the display 401 into the same message block or bubble that contains the URL.

Returning to FIG. 1, the imaging module 104 includes program code for operating an imaging system of the device 110, 120, 121. The imaging system may be a camera (e.g. a device that digitally records images on a computer readable medium by using a light sensor such as a charge coupled diode to detect a scene), or a camera phone that is able to capture photographs and video, e.g., using fixed focus lenses, optical sensors, or the like. A fixed focus lens is non-adjustable lens with a focal point that is fixed during manufacturing. Optical sensors may include electronic detectors that measure a quality of an image, e.g., light and motion sensors, being captured by the imaging system.

The imaging module 104 includes program code for interacting with an imaging system that is either directly or remotely attached to the device 110, 120, 121. For instance, the tagging module 101 may utilize the imaging module 104 to automatically tag images while images are being acquired by the imaging system, such that when an image is shared, it is immediately placed in the shoebox relative to the tags. For instance, as described in the picture message example above, the media management application 100 via the tagging module 101 automatically tags the image of the while the user (John) capturing the picture.

The media data access module 105 includes program code for carrying out access to and management of media data, whether from resources internal or external to the device 110, 120, 121, and corresponding media information. Further, the media data access module 105 works with the interface module 103 and other modules to acquire, create, manipulate, associate, and process media information. For example, items shown in an interface such as the interfaces 200, 300, 307 may be associated with items in internet resources 130 through the media data access module 105. For instance, in the exemplary user interface 307, in FIG. 3, illustrates displays priority messages that were assigned link tags by the tagging module 101. Further, the priority messages were assigned link tags because these messages contained a URL. Thus, the media data access module 105 connects the URLs of these priority messages to websites that correspond to the URLs, e.g., to websites within the internet resources 130 via the network 140.

The application module 107 includes program code configured to communicate directly with other applications, modules, models, devices, and other sources through both physical and virtual interfaces.

The scraper module 108 includes program code for processing content links, webpages, etc. that are included in priority messages. Accordingly, the scraper module 108 includes program code for a web page retrieval mechanism that may use the network 140 to retrieve website code or markup language, e.g., hypertext markup language (HTML), JavaScript, etc. The scraper module 108 also includes program code for a web page parser that may parse the retrieved web page source code and identify information that provides at least a partial description of the website. In some cases, meta-tags tags (e.g. <meta . . . >), which are elements used to provide structured metadata (i.e. the design and specification of data structures) about a web page, may include sufficient information for web site preview. If no sufficient elements are found in the header, the HTML structure may reveal some additional information. Thus, the scraper module 108 may parse the retrieved web page in accordance with a set of parsing rules, which are further described below. The scraper module 108 also includes program code for a presentation layer that generates presentation elements for presentation through the interface module 103 to the user (e.g. via the user interface 200, 300, 307).

For example, the scraper module 108 may use the web page retrieval mechanism to retrieve the HTML source code of a website, and may use the web page parser in accordance with a set of parsing rules to identify HTML identifiers, elements, or markup tags (e.g. HTML tags), such as <Header>, <Title>, <Body>, <HTML>, etc. The presentation layer of the scraper module 108 may be used to generate, based on the HTML source code, a header element, a picture preview, and a description. Parsing rules govern the order in which HTML identifiers are sought along with the priority given to each HTML identifiers. That is, because one HTML identifier may be more likely to contain information that succinctly describes a web page, that HTML identifier may be both searched for and used first by the scraper module 108. Because HTML identifiers are keywords (tag names) surrounded by angle brackets like <html>, and because HTML elements normally come in pairs like <a> (i.e. the start or opening tag) and </a> (i.e. the end or closing tag), the scraper module 108, via the web page parser and a default hierarchy of parsing rules, may search for a specific first HTML element (the start or opening tag) in a pair of HTML elements. Once the first HTML element is identified, the information between the opening and closing tag may be used to generate the presentation elements.

For instance, a default parsing rule may be to search for the title of a web page. Therefore, after the scraper module 108 retrieves the HTML source code, the scraper module scans the HTML source code for the opening title markup tag (i.e. "HTML <title> markup tag"). The information or text between the HTML <title> markup tag and the closing title markup tag (i.e. "HTML </title> markup tag") may be used to generate the header element. Therefore, the header information may be a title of a webpage. Alternatively, the default parsing rule may be to search for the header information from a caption of a picture. Thus, when the HTML identifiers indicating a caption are identified by the web page parser, the information within those identifies is used to generate the header element. Another example of parsing rules includes scanning, using the scraper module 108, the HTML source code for a first HTLM picture identifier to generate a picture preview.

Alternatively, a set of parsing rules may require that the scraper module first review HTML meta-tags before parsing HTLM markup tags. That is, the scraper module 108 may identify a description of a web page by first checking the meta-tags of the HTML source code for an available description. If the scraper module 108 does not find an short description associated with the meta-tags, the scraper module 108 may then search for the opening body markup tag (i.e. HTML <body>), scan the text within between the HTML <body> markup tag and the closing body markup tag (i.e. "HTML </body> markup tag"), remove all "href" and image objects in the scanned text, and retrieve the first "X" number of words in the paragraph, where "X" is a positive integer. Note that any HTML element may be used by the scraper module 108 to identify information that succinctly details the website and the scraper module 108 may search the entire HTML page structure to select information. The above described parsing rules are examples, and it is understood that various adjustments may be made to the set of parsing rules such that alternative identifier hierarchies may be established.

The scraper module 108 at least generates the header element. Moreover, the scraper module 108 may also generate the description (e.g. an excerpt from the first paragraph of an article located on a website), the picture (e.g. a thumbnail image) and other presentation elements, such as an identity of a sender (e.g. the user that initiated the message), a timestamp (e.g. a transfer time and date of the priority message), a link (e.g. the URL itself), an icon (e.g. an item not originating from the webpage but defining the type webpage—a picture of a newspaper for a news outlet), etc.

Additionally, if the web page retrieval mechanism fails to retrieve source code of the website, the web page parser fails to parse the retrieved source code, or the scraper module 108 fails to identify information that succinctly details the website, the presentation layer may automatically not generate the presentation elements, and may hide the relative portions of the presentation elements so that the interface module 103 shows an empty space, or generates an error display element. The error display element is an error prompt that explains that a failure was produced by the web page retrieval mechanism, web page parser, or the scraper module 108 (e.g. a link resolution problem or a prompt that indicates that when the link may be resolved at a later time if a connection is lost).

The scraper module 108 further includes program code for differentiating information within the web page source code and is configurable to adjust information to fit within predetermined character or sentence limits. For example, links and source code references (e.g. HTML tags) within a web page may guide the scraper module 108 in differentiating information, such as selecting one picture over another picture, detecting that one picture is more important, or finding a centralized part of a web page. For example, the scraper module 108 may identify a picture marked for preview in the header of the HTML document. If no such picture is available, the scraper module 108 may look for a picture in the main portion of the document and pick a first identified picture. If no first identified picture is found, the scraper module 108 may make a determination as to whether to display a placeholder thumbnail (i.e. the scraper module 108 is configured to determine criteria for deciding whether to use the parsed identifiers), such as determining that a blank square should be displayed or not include any picture. Other examples of the scraper module 108 choosing not to present or include a presentation element when a web site does not have a standard structure or uses a non-compliant source code language, when content was attempted to be lifted by the web page did not have any meaningful content, and when the URL is linked to a piece of content that is not supported (e.g. power point presentation or an application to download).

Thus, the media management application 100 utilizing the above modules 101-108 is configured to provide media management by generating a shoebox interface that will organize and display the tagged priority message. Although the above example of the media management application 100 includes certain specific modules 101-108, the same or similar operability may be achieved using fewer, greater, or differently named modules located on the same or separate devices 110, 120, and 121.

For example, the host management device 120 generally includes a host media management application 122 that may include instances of one or more of modules 101-108 to be accessed and used by client devices 121. For example, a client device 121 may have a "light" application 100 as mentioned above, and therefore the device 120 may process information and provide computing operations for the client devices 121.

Further, the client devices 121 may be configured with a client media management application 123 that performs a set of tasks, such as identifying priority messages and then communicating requests to the host media management application 122 for tagging the priority messages and for resolving content that requires further processing. That is, the client device 121, rather than processing the information itself, will send a request to the media management application 100 to tag or further process the priority messages. Thus, the client devices 121 may provide, share, and rely upon the host media management application 122 to reduce the resource requirements on the client devices 121 and generally enhance efficiency of the system 150.

In addition, operations of the host media management application 122 may also be divided between the client devices 121 and the device 120, where the services of the host media management application 122 may be located separately on and accessed by any device, such that any segment of the host media management application 122 is provided for, shared, and relied upon by other devices. Alternatively, the client devices 121 may be user devices including a conventional web browser application, with the host media management application 122 configured to run in the context of the web server.

Further, the exemplary media management system 150 operates over the network 140, which may be a cellular network; however, it may alternatively or additionally be any conventional networking technology. For instance, network 140 may include the Internet, and in general may be any packet network (e.g., any of a cellular network, global area network, wireless local area networks, wide area networks, local area networks, or combinations thereof, but is not limited thereto). Further, for communication over the network 140, devices 110, 120, 121 may utilize any interface suited for input and output of data including communications that may be visual, auditory, electrical, transitive, etc.

Furthermore, the exemplary media management system 150 may include internet resources 130, which may include one or more of a variety of resources, including website databases, file storage databases, media databases, data repositories, and the like that are implemented through hardware, software, or both. Internet resources 130 may also include various kinds of mechanisms for storing, accessing, and retrieving various kinds of data, including a hierarchical database, a set of files in a file system, an application database in a proprietary format, a relational database management system (RDBMS), etc. Internet resources 130 are typically external to devices 110, 120, 121 for use by the media management applications 100, 122, 123 (i.e., internet resources 130 may be, but are generally not, local storage resources for devices 110, 120, 121).

Further, the media management applications 100, 122, and 123 may be configured to operate in as background processes on respective devices 110, 120, 121 without user interaction; e.g., applications 100, 122, 123 may perform scanning, identifying, tagging, and storing automatically. The media management application 100, when executing the automatic background process of scanning messages and applying tags, may also automatically identify priority messages that require further processing.

For instance, specific tags, such as a web link, postal address, or the like, indicate that a priority message should be further processed by the media management application 100. As an example, when a message contains a link such as a uniform resource locator (URL), the media management application may obtain information about content indicated by the link by using the URL to access a web page and retrieve specific information on the webpage. The information is then presented to the user in the context of a conversation in which the message was received, e.g., a header, photo, and description may be displayed. Similarly, when a message contains an address, the media management application generates a cartographical view, e.g., a map pinpointing the address of the address. However, although the media management applications 100, 122, and 123 may operate automatically, the features of the process are programmable through the application to be accessible via user interaction, such as editing of tags, manual tagging, flagging messages, etc.

Figure 5:
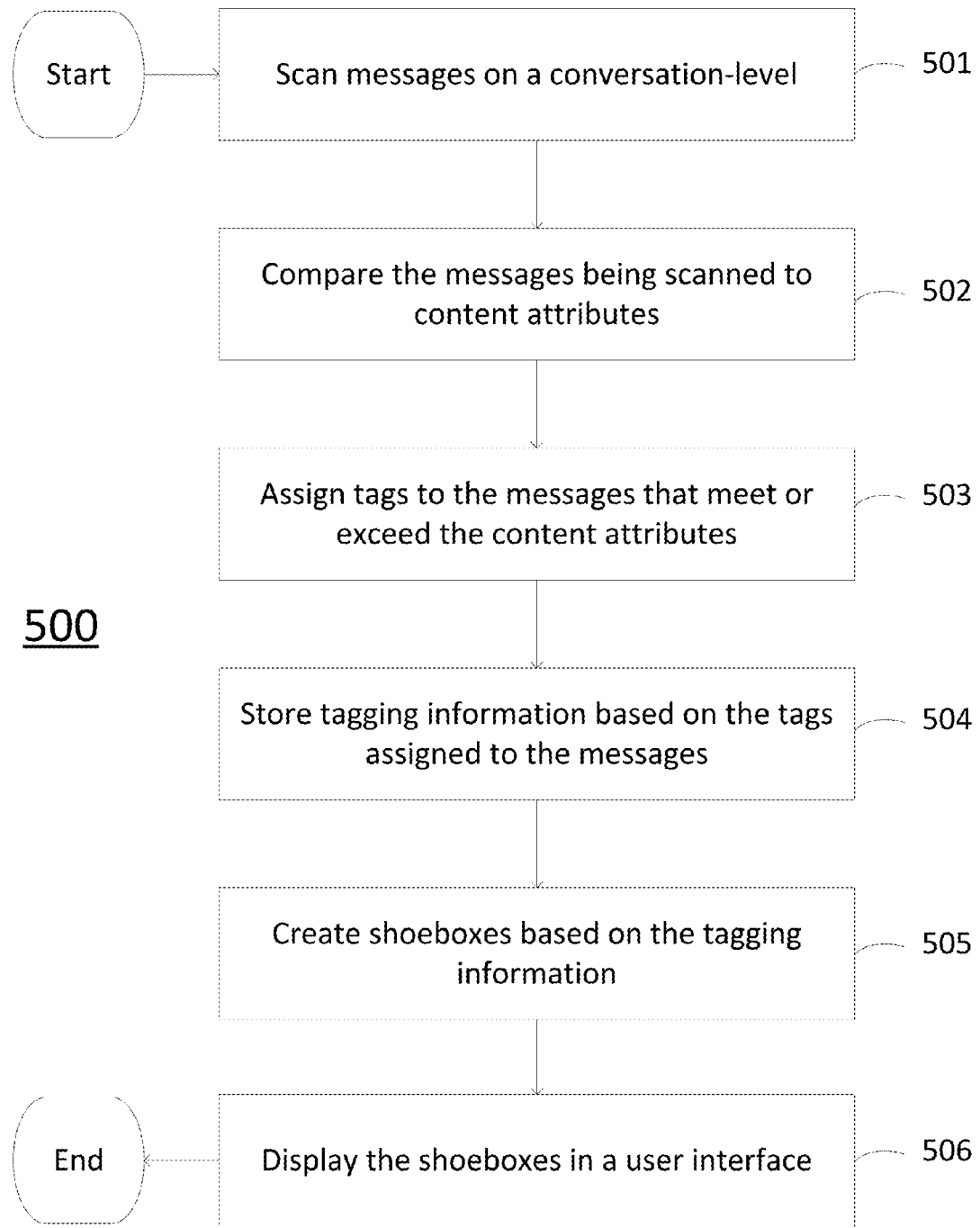
FIG. 5 illustrates a flowchart of an exemplary media management process that may be implemented by a media management application.

FIG. 5 is a flowchart illustrating an exemplary media management process 500 that may be implemented by the media management applications 100 in the system of FIG. 1. The media management process 500 starts in a block 501 wherein the tagging module 101 scans messages within an inbox of a messaging service on a conversation-level, i.e., messages within a conversation, to identify priority messages (e.g. messages that are or include content as defined above). As described above, a conversation is a set of messages between users via respective devices, e.g., referring to the discussion of FIG. 2 above, each conversation represents messages between a currently loaded account labeled "John" 202 and remote user accounts loaded on their respective devices. Messaging services may sort messages by grouped by conversation. In contrast, email services often list all messages in chronological order regardless of the communicating parties. Thus, because messaging services generally sort messages by conversation, the media management process 500 scans messages within a messaging service (e.g. SMS or MMS) on a conversation level.

Next, in block 502, to identify priority messages, the tagging module 101 compares the messages being scanned to content attributes that measure or check metadata associated with the messages. If a message being scanned does not match or exceed the content attribute then that message is not subject to tagging. Further, messages that do not meet or exceed the content attribute may be flagged as a non-priority message so that if the process 500 rescans messages within the messaging service, the non-priority message may be skipped. When the message being scanned does meet (or exceed) the content attribute, this message is identified as priority message. The messages within each conversation may be divided into two collections (i.e. priority message and non-priority message) at the conclusion of message scanning.

In one example, when the media management application 100 is first installed on a device 110, 120, 121, the media management application 100 identifies whether a messaging inbox contains messages and, if so, triggers a background scanning and tagging process. The scanning and tagging process uses content attributes to tag messages with tags from a scalable tag list when those messages match or exceed the content attributes. Further, when the messaging inbox receives or sends, respectively, new incoming or outgoing messages, the background scanning and tagging process is executed for these messages to identify whether the new messages pass attribute tests, to automatically assign suitable tags. Receiving a message in an inbox includes adding a message to an already existing set of messages in the inbox, such as when a message is created by and sent from the device 110, 120, 121 or when the device 110, 120, 121 receives a new message.

Next, in block 503, after the priority message is identified, the tagging module 101 assigns tags on an individual basis to each identified priority message. For example, a heuristic identifies the contents of each identified priority message and assigns a tag from a scalable tag list to each message based on the identified content. For instance, when a picture message is sent or received, the picture may be tagged as a photo. Similarly, when a postal address or an email address is part of a message, the postal address or the email address may be tagged as contact information (e.g. a V-card may be identified as a priority message and tagged for a content shoebox). Further, when a message that includes information regarding a restaurant is sent or received, key items pulled out of this messages may be the restaurant's web site, address, and phone number. Therefore, the message that includes information regarding the restaurant is respectively labeled with three separate tags: link, location, and contact.

Continuing the process 500, next, in block 504, the storing module 102 stores tagging information based on the tags assigned by the heuristic, in block 203, so that the heuristic may draw upon this information for tagging newly received messages. That is, once tags are applied to the messages within the messaging inbox of the messaging service, tagging information, such as the content attributes used for tagging along with metadata and attribute information of the content, are stored by the storing module. Therefore, as the tagging module 101 identifies, compares, and tags content, the storing module tracks, extracts, and stores tagging information to build a knowledge base. Using the knowledge base, new messages that have similar characteristics to one or more previously tagged messages will be automatically tagged with these messages' tags based on the knowledge base. Thus, when the messaging inbox receives or sends new incoming or outgoing messages, the tagging module 101 executes the heuristic on a per message basis (i.e. the message is processed as it arrives or leaves the messaging inbox), using the knowledge base to scan and tag content. Also, while the local computer readable media of the device 110 may be used to store the tagging information, remote or cloud storage may also be used.

In addition, the storing module 102 may store additional information other than the tagging information to build the knowledge base. For instance, additional information may include bookmarked message information, tag alteration information, and the like. Bookmarked message information is information regarding messages that a user has manually tagged with a custom tag, which may have been manually added by the user to the scalable tag list. Tag alteration information is information regarding messages that received a tag from the media management process 200 and were later re-tagged or given a different tag by a user. Thus, if the amount of alteration information increases, the media management process 500 may tag specific messages based on the tag alteration information.

Further, while appended messages that have similar characteristics to previously tagged messages will be automatically tagged with similar tags based on the knowledge base, new unrecognized messages may be assigned new tags or identified by a "may be of an interest" tag, as discussed above.

Next in block 505, the tagging module 101 creates shoeboxes based on the tagging information (i.e. the tags that were assigned to the priority messages). That is, message shoeboxes, which organize content for user access and interaction into compartments or folders, and a user interface, which presents each shoebox for user operation and manipulation, are created using the tags assigned by the tagging module 101. For instance, the tagging module 101 uses the tagging information to generate a list of assigned tags and to thereby generate a list of shoebox titles. The module 101 then populates each shoebox with the messages that have the matching tag. Additionally, when a messaging inbox is appended with new incoming or outgoing messages, an automatic scanning and tagging process is executed on a per message basis to identify whether the new messages pass the attribute tests, to automatically assign tags, and to sort new messages into the suitable shoeboxes. Further, a "may be of an interest" shoebox may be accessible to users on the device through the display.

Next in block 506, the shoeboxes that contain the tagged messages are displayed by the interface module 103 in a user interface. For example, the shoeboxes that contain the tagged messages may be displayed by the interface module 103 in an interface 200 or a shoebox list view 300 on a conversation-level, as generated by the media management application 100.

Following block 506, the process 500 ends.

Figure 6:
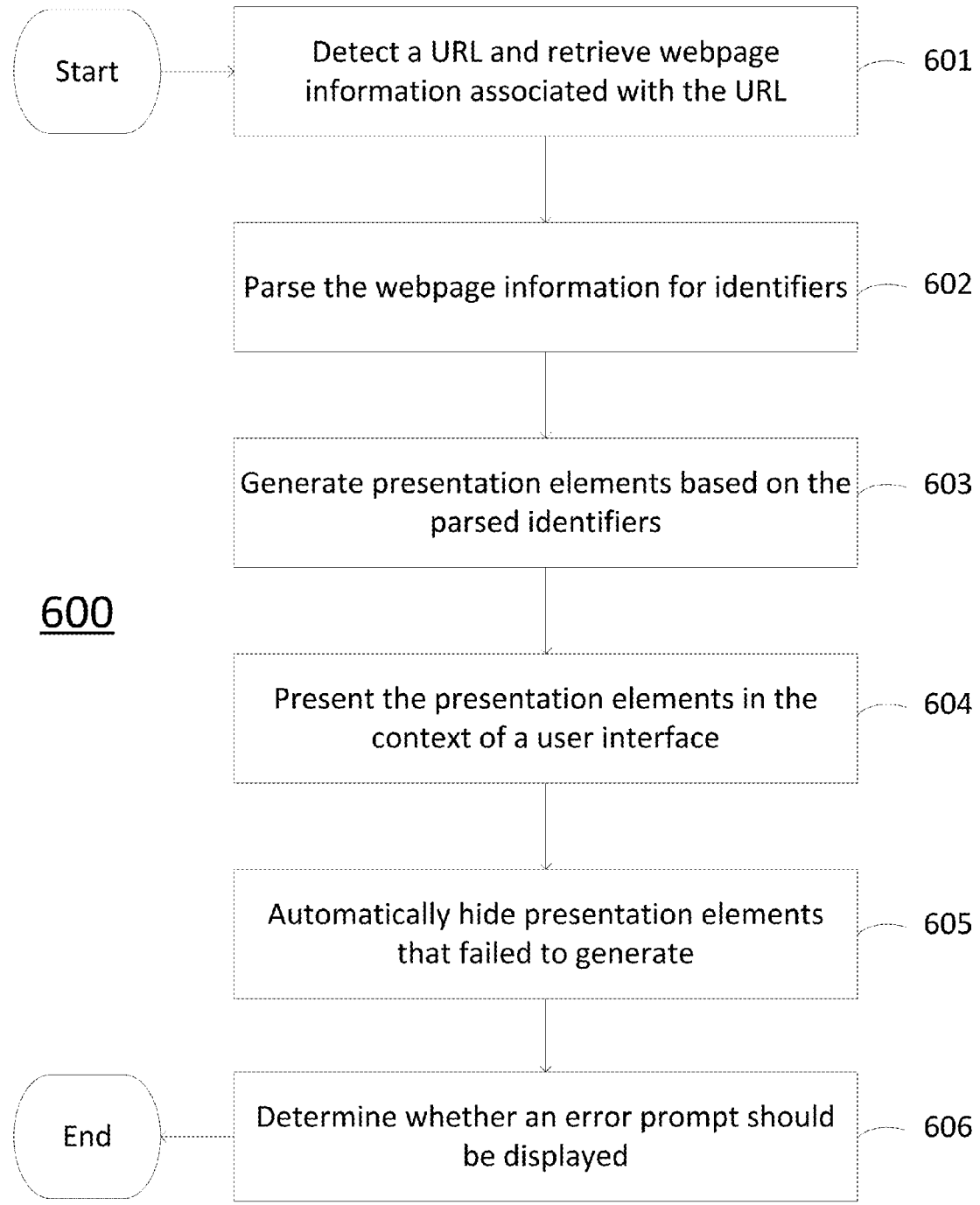
FIG. 6 illustrates a flowchart of an exemplary link resolution process that may be implemented by a media management process.

FIG. 6 illustrates a flowchart of an exemplary link resolution process 600 that may be implemented by the media management process of FIG. 5. For example, when the shoeboxes that contain the tagged messages are displayed in the user interface, as described in block above, it is likely that a "Links" shoebox 303 may be part of the user interface. Thus, the media management application 100 may proceed to resolve the links in the "Links" shoebox 303 by the exemplary link resolution process 600. The exemplary link resolution process 600 starts, in block 601, when the tagging module 101 detects a URL being sent or received by a device 110, 120, 123 in a conversation. The web page retrieval mechanism of the scraper module 108 may then use a data connection to retrieve the web page information via network 140.

Next, in block 602, the web page parser of the scraper module 108 is activated to parse the HTML source code of a web page indicated by the received URL to identify HTML identifiers. An example of such identifiers may be <Header> and <Title>.

Next, using the parsed identifiers, in block 603 presentation elements are generated by the scraper module 108 by evaluating the web page to identify information that may be relevant as a summary description of the page. The criteria used for evaluating the web page may include elements (e.g. a header element, a picture, and a description, as extracted from the HTML structure) from the web page as they are available. When it is the case that the HTML meta-tags include information regarding what elements consist of a preview of the page then the process 600 picks these elements. Alternatively, the process 600 picks the elements associated with identified HTML elements (e.g. HTML <title> markup tag or an image or a text body included in the main portion of the page that may be suitable for a description and a picture. The scraper module 108 generates at least a header element; moreover, additional presentation elements may include a description and a picture (e.g. a thumbnail image), as each URL may include one or more of the elements.

Next, in block 604, once the elements are generated by the scraper module 108, the elements are presented by the presentation layer through the interface module 103 to the user (i.e. in the context of a user interface).

Next, in block 605, if the scraper module 108 fails in any manner, e.g., as described above, the presentation layer may automatically hide the portions of the presentation that are relative to the scraper module 108 failures so that the display does not show an empty space on the screen.

Next, in block 606, based on the failure, the scraper module 108 may determine whether an error prompt should be displayed that explains the link resolution problem (e.g. a prompt that indicates that when the link may be resolved at a later time if a connection is lost). Furthermore, when information is unable to be retrieved, the link resolution process may be optimized for the following scenarios: (1) display an error to the user, indicating a problem have occurred; (2) display the web link without additional information; and (3) display partial information if available (for example: displaying a header and descriptor but no picture). For example, at the completion of the link resolution process 600, the link interface 307 of FIG. 3 is populated with presentation elements generated from identifiers parsed from a webpage. In particular, the link interface 307 of FIG. 3 contains the following set of presentation elements: the header 309 (i.e. "Travel Guide for Paris"), the specific URL 310 (i.e. "www.parislogue.com"), the descriptor 311 (i.e. "French tourism . . . 10/22."), and a picture 312 (i.e. a blank square).

Following block 606, the process 600 ends.

In another example, the link resolution process may be implemented independently in messaging service (e.g. as described in FIG. 4 above) or with some third party services (e.g. Twitter® or Facebook®). That is, the link resolution process may be configured in conjunction with the user interface 400 of a messaging service so that when a message is transferred with a URL, the URL is resolved directly in the messaging service. Further, the link resolution process may be configured in conjunction with a Twitter® account so that when a tweet is received with a URL, the URL is resolved directly in the messaging service. Therefore, the elements are presented on the screen next to the message in which the link was included such that the elements and the link fit within the message service's display area (e.g. message bubble size may be adjusted dynamically).

The link resolution process in the above example is generally performed on a viewer device. A viewer device is a device 110, 121 that is currently displaying the user interfaces, as described above, to a user or viewer. Therefore, the link resolution process may also be referred to as a viewer-side processing, i.e., processing that is performed via a viewer device's network. A viewer device's network is a network that is generally included in network 140; however, because a telecommunications service provider may charge a user according to the user's data limit (i.e. setting a maximum amount of data that a device 110, 121 can send or receive before further use charges are billed), a viewer device's network is further defined as the viewer device being the center of the network where only data amounts transferring to or from the viewer device are logged.

For example, when a sender forwards a link, only the URL information is sent from the sender's phone (e.g. a device 110) to the receiver's phone (e.g. a device 121). Further, once the link is received by the receiver's phone, each phone will have the link. With both the sender's phone and receiver's phone now in possession of the link, each phone will respectively resolve the link independent of the other phone. In this case, when the user or sender uses their device 110 (i.e. the sender's phone), the sender's phone is the viewer device for the sender and will perform the link resolution process as the viewer-side processing via the viewer device's network (i.e. senders network).

Alternatively, when the user or receiver uses their device 121 (i.e. the receiver's phone), the receiver's phone is the viewer device for the receiver and will perform the link resolution process as the host-side processing via the viewer device's network (i.e. receivers network). The receiver's phone sends a request to the host management device 120 to perform the link resolution process and the host management device 120 may only reply with the presentation elements. Thus, the receiver's phone has utilized the receiver's network minimally to request the link resolution process and receive presentation elements, while the sender's phone has utilized the sender's network extensively in comparison to retrieve, parse, and identify information associated with the link (i.e. thus, the receiver's phone will accumulate less data against their data plan). In addition, the information is a static snapshot of the elements pulled from the resolved link, yet it is possible to render dynamic elements that update as the URL updates (e.g. sending a link to a live blog).

Further, because the media management application 100 and the link resolution process are based on the viewer side, there is no requirement for both parties (sender and receiver) to have the software on their devices. Also, because the viewer side performs the processing, the viewer side device 110 may automatically manage data retrieval, such that the most cost effective (in terms of data rates) method may be used to retrieve and resolve data. For example, if there is a network failure, the media management application 100 and the link resolution process may pick up the content later when a cost efficient communication system is available.

Computing devices such as those disclosed herein may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. Computing devices in general may include any one of a number of computing devices, including, without limitation, a computer workstation, a desktop, notebook, tablet, laptop, or handheld computer (such as a smartphone or personal digital assistant), or some other computing device.

Computing devices such as disclosed herein further generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

What is claimed is:

1. A processor-automated method, comprising:
    scanning by a processor a set of messages within an electronic messaging service, wherein the electronic messaging service provides multi-modal media messages that are tag-able based on time and location such that the set of messages comprises text and audio-video content according to a timestamp and a location tag;
    comparing by the processor content of each message of the set of messages to one or more content attributes;
    tagging by the processor each message that matches or exceeds at least one of the content attributes with a tag from a tag list;
    electronically storing by the processor each tagged message in a storage unit generated based on at least one tag associated with the message; and
    providing a user interface that substantially simultaneously presents a representation of the storage units, a sub-menu, and the messages that were tagged.

2. The method of claim 1, wherein scanning the messages is performed on a conversation that is a set of messages between users.

3. The method of claim 1, wherein the representation of the storage units is a tile menu that displays a tile for each storage unit, and
    wherein the user interface includes the sub-menu that lists a set of remote users, wherein each remote user is selectable, and
    further wherein the selection of any remote user manipulates the tile menu in accordance with the tags used from the tag list for messages and content transferred between the selected remote user and currently loaded account.

4. The method of claim 1, further comprising:
    building a knowledge base, comprising a set of default rules, using tagging information generated from the scanning, comparing, and tagging of the messages.

5. The method of claim 4, further comprising:
scanning and tagging messages using the set of default rules of the knowledge base to map at least one content attribute to at least one specific tag.

6. The method of claim 1, wherein the tag list is scalable, such that the tag list is modifiable to add or delete at least one tag.

7. The method of claim 1, wherein the representation of the storage units is a tile menu that displays a tile for each storage unit,
the user interface includes the sub-menu that lists a set of remote users, wherein each remote user is selectable, and
the sub-menu and the tile menu are each located separately in at least one selectable portion of the user interface.

8. A non-transitory computer readable medium including a set of computer-executable instructions, the instructions comprising instructions for:
scanning a set of messages within an electronic messaging service,
wherein the electronic messaging service provides multi-modal media messages that are tag-able based on time and location such that the set of messages comprises text and audio-video content according to a timestamp and a location tag;
comparing content of each message of the set of messages to one or more content attributes;
tagging each message that matches or exceeds at least one of the content attributes with a tag from a tag list;
electronically storing each tagged message in a storage unit generated based on at least one tag associated with the message; and
providing a user interface that substantially simultaneously presents a representation of the storage units, a sub-menu, and the messages that were tagged.

9. The medium of claim 8, wherein scanning the messages is performed on a conversation that is a set of messages between users.

10. The medium of claim 8, wherein the representation of the storage units is a tile menu that displays a tile for each storage unit, and
wherein the user interface includes the sub-menu that lists a set of remote users, wherein each remote user is selectable, and
further wherein the selection of any remote user manipulates the tile menu in accordance with the tags used from the tag list for messages and content transferred between the selected remote user and currently loaded account.

11. The medium of claim 8, further comprising:
building a knowledge base, comprising a set of default rules, using tagging information generated from the scanning, comparing, and tagging of the messages.

12. The medium of claim 11, further comprising:
scanning and tagging messages using the knowledge base, wherein the knowledge base comprises a set of default rules that is used for said scanning and tagging by mapping at least one content attribute to at least one specific tag.

13. The medium of claim 8, wherein the tag list is scalable, such that the tag list is modifiable to add or delete at least one tag.

14. The medium of claim 8, wherein the content attributes include domain designations, file extensions, data file size limits, key words, metadata, location signatures, and codes.

15. A device, comprising:
a memory that stores a media management application, wherein the application includes:
a tagging module that scans a set of messages within an electronic messaging service, wherein the electronic messaging service provides multi-modal media messages that are tag-able based on time and location such that the set of messages comprises text and audio-video content according to a timestamp and a location tag, compares content of each message of the set of messages to one or more content attributes, and tags each message that matches or exceeds at least one of the content attributes with a tag from a tag list;
a storing module that generates a storage unit based on at least one tag associated with the message and electronically stores each tagged message in the storage unit; and
an interface module that provides a user interface that substantially simultaneously presents a representation of the storage units, a sub-menu, and the messages that were tagged.

16. The device of claim 15, wherein the tagging module scans the messages within a conversation that is a set of messages between users.

17. The device of claim 15, wherein the representation of the storage units is a tile menu that displays a tile for each storage unit, and
wherein the user interface includes the sub-menu that lists a set of remote users, wherein each remote user is selectable, and
further wherein the selection of any remote user manipulates the tile menu in accordance with the tags used from the tag list for messages and content transferred between the selected remote user and currently loaded account.

18. The device of claim 15, wherein the tagging module builds a knowledge base, comprising a set of default rules, using tagging information generated from the scanning, comparing, and tagging of the messages.

19. The device of claim 18, wherein the tagging module scans and tags messages using the knowledge base, wherein the knowledge base comprises a set of default rules that is used for said scanning and tagging by mapping at least one content attribute to at least one specific tag.

20. The device of claim 15, wherein the tag list is scalable, such that the tag list is modifiable to add or delete at least one tag.

21. The device of claim 15, wherein the content attributes include domain designations, file extensions, data file size limits, key words, metadata, location signatures, and codes.

* * * * *